3,780,138
METHOD FOR SEPARATING METAL CONTAMINANT FROM ORGANIC POLYMERS
Howard L. Hassell, San Leandro, James C. Watson, Torrance, and Benjamin W. Shaw, San Pedro, Calif., assignors to Shell Oil Company, New York, N.Y.
No Drawing. Filed Sept. 14, 1971, Ser. No. 180,526
Int. Cl. C08f 27/24
U.S. Cl. 260—880 B          8 Claims

ABSTRACT OF THE DISCLOSURE

A method is provided for separating metal catalyst contaminants from organic polymers, typically polymers derived from dienes and/or vinyl arenes, by treatment with an aqueous solution of citric acid, an oxidant, and optionally, a lower aliphatic alcohol, then separating the aqueous phase to remove the contaminating metal. Alternatively, the polymer may be contacted with an oxidant before treatment with the aqueous solution.

BACKGROUND OF THE INVENTION

This invention is concerned with a method for removing metal catalyst contaminants from organic polymers. It is specifically concerned with a multistep method in which contaminating metal ions in a polymer are removed by treatment with an oxidant and dissolved and complexed by citric acid in aqueous solution, which is then separated to remove dissolved metal ion.

The hydrogenation of unsaturated polymers is well known in the prior art. Usually a solution of the polymer in an inert solvent is contacted at elevated temperature with hydrogen under pressure in the presence of a heavy metal catalyst which usually comprises at least one transition metal catalyst comprising nickel, cobalt or iron, with or without aluminum or lithium. Specific techniques may be found in British Pat. 1,020,720.

Unsaturated polymers are hydrogenated for a variety of reasons. The presence of olefinic double bonds in the polymers makes them susceptible to oxygen attack and to deterioration by actinic radiation; saturation of olefinic double bonds greatly improves environmental stability. Hydrogenation may improve color. Polyethylene has been produced by hydrogenation of elastomeric polybutadiene (Ind. and Eng. Chem. 45, 1117–22 (1953), and Rubber Chem. and Tech. 35, 1052 (1962)). In certain block copolymers or homopolymers resistance to flow under stress when hot is improved by hydrogenating the aromatic rings to alicyclic rings. In other block copolymers made solely from dienes, good thermoplastic elastomers can be produced by hydrogenating all of the olefinic doubl bonds.

A common problem shared by all of these types of hydrogenated polymers is the deleterious effect of the small amounts of metal catalyst residues remaining after hydrogenation. The quantity of metal to be removed may be as high as 50,000 parts per million. The metal causes polymer deterioration by promoting reactions with air and actinic radiation, and must therefore be removed almost completely, e.g., to less than about 10 p.p.m. although higher limits may be adequate for some purposes. Filtration may be carried out first to remove much of the catalyst, but residual contamination is very difficult to remove by purely physical separation; chemical reaction and then separation are required.

After the hydrogenation reaction to saturate the double bonds in the polymer, metal catalyst residues remain and vigorous reaction, sometimes at elevated temperatures and for extended time, is required to dissolve them. Strong acids such as hydrochloric acid and sulfuric acid have been used in the past, but such mixtures are very corrosive and may have a deleterious effect on equipment used and on the hydrogenated polymer from which the metals are being removed.

In selecting a suitable agent to remove metallic residues from the hydrogenated polymers, a complex and interrelated set of criteria should be considered as desirable: The agent chosen should be substantially inert toward the polymer and polymer solvent; it should be capable of forming a stable water-soluble complex with iron (often present as a contaminant from equipment or water); capable of forming a stable water-soluble complex with nickel or cobalt and aluminum (present as hydrogenation catalyst residues over a wide pH range); preferably when lithium initiated polymers are concerned, it should be capable of complexing with any lithium residues which may remain after forming the original polymers. Agents which fail to satisfy any one of the above criteria may be regarded as unsatisfactory for the present purpose.

OBJECTS OF THE INVENTION

It is an object of this invention to provide an improved method of separating metal catalyst contaminant from organic polymers. It is also an object of this invention to provide an improved method for removing metal catalyst contaminants from organic polymers by a multistep method in which the polymer is treated with an oxidant and an aqueous solution of a complexing acid containing, optionally, a lower alcohol.

STATEMENT OF THE INVENTION

Now, in accordance with this invention, a multistep method is provided for treating water insoluble polymer solutions contaminated with catalyst residues comprising one or more of the metals of iron, nickel, cobalt, lithium and aluminum, said method comprising the steps of:

(A) treating said product in a water-immiscible solvent with an oxidant, preferably selected from the group oxygen, air, hydrogen peroxide, acyl peroxides and alkyl or acyl hydroperoxides, then (B) treating said product with an aqueous solution of citric acid, the aqueous solution also containing, optionally, a lower aliphatic alcohol, and (C) separating the aqueous phase from the hydrogenation product, thereby removing the contaminating metal catalyst residues.

Also, in accordance with this invention, a method is provided in which steps A and B are combined, that is, the treatment with an oxidant is conducted simultaneously with contacting of the aqueous complexing polycarboxylic acid solution with the hydrogenation product.

The method of this invention may also be applied to organic polymers that are not necessarily products from hydrogenation, but which contain metal contaminants. Such a polymer may be contaminated incidentally with metal, such as iron or nickel, produced by reducing a metal compound, as with an aluminum alkyl compound.

The various components of the hydrogenation product and the agents used in the metal removal treatment will now be described:

Among the unsaturated polymers that may be hydrogenated to products suitable for treatment by the method of this invention are homopolymers made from open chain conjugated dienes having from 4 to 8 carbon atoms per molecule, preferably 4 to 6 carbon atoms per molecule, various types (e.g., block or random) of copolymers of these conjugated dienes with vinyl arenes, and homopolymers of vinyl arenes.

The homopolymers, random copolymers and block copolymers can be made by processes well known to the art. Free radical polymerization of unsaturated hydrocarbon monomers is discussed at length in Whitby's book "Synthetic Rubber" and in hundreds of patents and scientific papers. Block copolymers are the subject of many patents and numerous scientific papers. References that describe polymerization techniques for block polymers are U.S. Pats. 3,231,635; 3,301,840; 3,465,063; and 3,281,383. The term "vinyl arene" as used herein is intended to include styrene, ring substituted styrenes and species having alkyl substituents on the vinyl group in the alpha position such as alpha methyl styrene.

These unsaturated polymers may be hydrogenated partially, or selectively, or completely by techniques known to the art, using finely divided metals as catalyst and hydrogen under pressure and elevated temperature. The catalyst may be for example, nickel or kieselguhr, Raney nickel, finely divided cobalt, and the like. It will be understood that it is not important to this invention how the metal catalyst was made. With these catalysts hydrogenation may be partial or complex, in the sense that all or part of the double bonds in the unsaturated polymers are saturated.

A particularly useful type of metal catalyst is made by reducing a metal compound or chelate of cobalt or nickel, with an aluminum containing reducing agent. An example is a reaction product of nickel acetate with triethyl aluminum. Nickel and cobalt salts of alkanoic acids with from 1 to 12 carbon atoms in the alkanoate moiety are particularly suitable, as are nickel chelates, such as nickel acetylacetonate. Dicobalt octacarbonyl, cobalt acetate, cobalt hydroxide and cobalt salts of alkanoic acids all produce essentially the same results. Organometallic reducing agents may be aluminum compounds, especially hydrocarbyls such as aluminum triethyl, aluminum triisobutyl, aluminum triphenyl and the like. Lithium aluminum hydride, aluminum hydride and aluminum powder may also be used as reducing agents.

These catalysts permit selective hydrogenation of copolymers as disclosed in detail in U.S. Pat. 3,595,942.

Suitable precursor polymers include linear and branched configurations having individual polymer blocks such as polybutadiene, polyisoprene, polystyrene or poly alpha-methylstyrene. Typical species include polystyrene-polyisoprene, polystyrene-polybutadiene-polystyrene and poly(alpha-methylstyerene) - polyisoprene - poly(alpha-methylstyrene).

Typical completely hydrogenated polymers containing metal catalysts that benefit from the method of this invention are hydrogenated polybutadiene, hydrogenated polyisoprene, completely hydrogenated polystyrene, completely hydrogenated random styrene-butadiene copolymers, completely hydrogenated vinyl arene-diene block copolymers, described in U.S. Pats. 3,333,024 and 3,431,323, and completely hydrogenated all-diene block copolymers, described in U.S. Pat. 3,465,063. Suitable hydrogenation conditions and catalysts are described in Canadian Pat. 815,575.

Hydrogenation may be conducted under the usual conditions known to the art, as represented especially by U.S. Pat. 3,595,942 and British Pat. 1,020,720.

When hydrogenation is finished, the metal catalyst residue is insoluble in the water-immiscible inert solvent, usually a hydrocarbon, used for the hydrogenation. The hydrogenated polymer may be in solution, or it may be partially precipitated if the polymer structure is such that it partially crystallizes; for example, a hydrogenated polystyrene-polyisoprene-polystyrene is soluble in a cyclohexane hydrogenation solvent, but a hydrogenated cis 1,4 polybutadiene is a crystalline polyethylene that may be only partly soluble at room temperature. Aliphatic, cycloaliphatic and aromatic solvents may be used. Cyclohexane is a preferred solvent.

In the method of this invention now to be described the metal catalyst residue in the product is treated with an oxidant and is dissolved in an aqueous solution of citric acid. The metal atoms are believed to be converted to metal ions that become part of a water soluble complex ion. Treatment with oxidants may be done before or after the citric acid is contacted with the metal or, optionally, at the same time such contacting is done. Water soluble alcohols that may optionally be present in the aqueous acid phase also assist in metal removal. An additional benefit of citric acid in this process is its unexpected action in minimizing emulsion formation, an effect substantially more pronounced than that obtained with other emulsion suppressants such as alcohols or mineral acids. The method of this invention thus comprises (A) treating the water-immiscible polymer-metal-solvent product with an oxidant, then, or at the same time, (B) treating the product with an aqueous citric acid solution optionally containing a lower aliphatic alcohol, then (C) separating the aqueous phase containing dissolved metals from the rest of the hydrogenation product, then, optionally, (D) regenerating the separated aqueous acid solution by treatment with a cation exchange resin that moves metal ions, and recycling the aqueous acid solution.

The exact chemical mode of action of the oxidant in step A is not understood. Metal analyses show that the nickel content, for example, of one hydrogenated polymer is about 7 p.p.m. after treatment by this process using the oxidant, whereas treatment without oxidant leads to polymer containing 93 p.p.m. nickel. After 60 minutes extraction time using pretreatment with oxidant then complexing acid solution, at least 98% of the nickel was removed from the hydrogenation product, whereas without oxidant but using citric acid solution only 78% was removed during the same period. The oxidant is not critical but may be such typical species as oxygen, hydrogen peroxide or aryl or alkyl hydroperoxides. Amounts of oxygen required may range from 0.1 to 100 moles of oxygen per mole of metal, but a molar ratio between 0.1 and 5 is preferred. Hydrogen peroxide requirements may range from 0.1 to 100 moles per mole of metal in the hydrogenation product, with 0.1 to 5 the preferred range of the molar ratio. The quantities of alkyl hydroperoxides needed range from 0.1 to 100 moles per mole of metal, but freferably a molar ratio from 0.1 to 5 should be used.

Hydrogen peroxide may be added as a small amount of 30% hydrogen peroxide, but it is usually preferred to dilute the hydrogen peroxide to 0.1-5% before addition. Organic peroxides such as alkyl or aryl hydroperoxides suitable for this invention may be primary, secondary or tertiary alkyl hydroperoxides, although the tertiary alkyl hydroperoxides are preferred. Examples are ethyl hydroperoxide, butyl hydroperoxides, isopropyl hydroperoxide, tertiary butyl hydroperoxide and the like. Tertiary butyl hydroperoxide is a preferred oxidant.

The product may be contacted with oxidant before, or simultaneously with, treatment with aqueous citric acid. If oxidant is applied before the aqueous acid, it may be bubbled through the hydrocarbon polymer product, as with air or oxygen, or it may be added as a liquid or solution, as with hydrogen peroxide or tertiary alkyl hydroperoxide, with thorough agitation. During simultaneous treatment, the oxidant is dissolved in the aqueous solution of complexing acid, or is bubbled through the system.

The aqueous acid solution to be used in the method of this invention will contain 0.05 to 50% w. of citric acid in water; preferably 0.1 to 10% w. may be used.

The amount of citric acid used should be at least chemically equivalent to the moles of heavy metal contaminant present. The quantities of citric acid will depend on the particular metal contaminant and amount to be removed, and the stability of the complex it forms with the metal.

The water soluble alcohol present as an optional component in an amount of 1-20 wt. percent of the aqueous phase containing the complexing acid may be an aliphatic monohydric alcohol containing preferably not more than 4 carbon atoms.

Methanol, isopropanol and ethanol are preferred alcohols. It is necessary that the alcohol used be soluble in water to the extent of at least 1% w.

The treatment and phase separation steps of the method of this invention may be conducted at temperatures from about 5° C. to 200° C. and at pressures from 0.1 atm. to 20 atm. Preferred temperatures are from 10° C. to 200 C. and preferred pressures are from 0.5 atm. to 5 atm. Contact times will range from 0.01 hour to 10 hours in the treating steps and from 0.01 to 14 hours in the phase separation step, but preferred contact times are 0.25 hour to 5 hours in the treating step and 0.02 to 1 hour in the phase separation step.

Treatment of the product involves intimate mixing of the two immiscible phases by any of the techniques known to the chemical engineer.

When oxygen or air is used as an oxidant it may be introduced as pure oxygen gas or as a gas stream diluted with inert gases such as nitrogen. The oxygen may be pressured into or bubbled into or sparged into the hydrogenation product before the aqueous alcoholic "complexing acid" solution is added, or treatment may be done while the aqueous solution is present.

Phase separation to remove the aqueous solution containing the contaminating metal ions be done by any of several means known to the art. The multiphase system may be placed in a settling tank, or it may be centrifuged or it may be run through a tower containing coalescing fibrous material with a layer separation tank at the bottom, or by other means.

The relative phase volumes of hydrogenation product to aqueous solution of complexing acid may be from about 0.1 to about 10. Preferred ratios may be affected by the polymer being extracted and its concentration in the hydrocarbon phase, the amounts of contaminating metals to be removed, and economics.

The following examples illustrate the manner in which the invention may be carried out. The examples are for purposes of illustration, and the invention is not to be regarded as limited to any of the specific compounds or polymers or to the conditions recited.

EXAMPLES 1, 2 AND 3

One half gallon (2000 g.) quantities of 12% w. solution in cyclohexane of selectively hydrogenated polystyrene-polybutadiene-polystyrene block copolymer containing nickel and aluminum residues from the original hydrogenation catalyst (nickel acetylacetonate reduced with aluminum triethyl) were contacted in Example 1 with an equal volume of 1% w. citric acid hydrate solution at 70° C. The molar ratio of citric acid to nickel was about 50. The two phases were vigorously mixed by stirring for 60 minutes, then permitted to settle into two separate layers at 70° C.

Example 2 was conducted in the same way as Example 1 except that 100 ml. of air (atmospheric pressure) was bubbled through the hydrocarbon phase before contacting it with aqueous citric acid solution.

Example 3 was conducted in the same way as Example 1 except that 1.0 gram of 30% w. aqueous hydrogen peroxide was added to the hydrocarbon phase and agitated with it before adding the aqueous solution and mixing it with the hydrogenation product.

After separating the aqueous phase in each example, the percentage of the original amount of nickel removed from the hydrogenation product was determined. Results of these analyses are shown in Table 1.

TABLE 1.—NICKEL CONTENT OF TREATED HYDROGENATED BLOCK COPOLYMERS

|  | Example | | |
| --- | --- | --- | --- |
|  | 1 | 2 | 3 |
| Oxidant added | None | Air | (¹) |
| Extraction time, minutes: | Percent Ni removed ² | | |
| 5 | 27 | 67 | 64 |
| 60 | 78 | 98 | 98 |
| Residual nickel in polymer, p.p.m | 93 | 7 | 7 |

¹ Hydrogen peroxide.
² Percent of amount present in hydrogenation product before treatment.

The data in Table 1 show that improvement in rate of nickel removal and a large reduction in residual nickel content in the polymer occurred when extraction was done in the presence of the oxidants oxygen, or hydrogen peroxide. When no oxidant was used, the rate of removal of nickel was relatively slow and the residual nickel content of the polymer was much higher.

EXAMPLES 4 AND 5

Examples 4 and 5 show the benefits of including an alcohol in the aqueous phase. In both examples the solution of block copolymer was the same as that used in Example 3, while a 10% aqueous solution of citric acid hydrate was employed to give a citric acid/Ni molar ratio of 500. Extraction was conducted with 5% w. isopropanol present in the citric acid solution in Example 5 and without isopropanol in Example 4. The effect on nickel contaminant removal is shown in Table 2.

TABLE 2.—NICKEL CONTENT OF TREATED HYDROGENATED BLOCK POLYMERS

|  | Example | |
| --- | --- | --- |
|  | 4 | 5 |
|  | Percent of nickel removed ¹ | |
| Extraction time, minutes: | | |
| 1 | 16 | 40 |
| 5 | 67 | 82 |
| 15 | 84 | 96 |
| 30 | 93 | (97) |
| 60 | 98 | 99 |
| Residual nickel in polymer, p.p.m | 7 | 4 |

¹ Percent of amount present in hydrogenation product before treatment.

The data in Table 2 show the beneficial effect of including an alcohol in the aqueous complexing acid solution on the rate of nickel removal and on the residual nickel of the dry polymer recovered from the treatment.

We claim as our invention:

1. The method of treating a nickel-contaminated water-insoluble product made by hydrogenating an unsaturated polymer of the group consisting of conjugated diene homopolymers and copolymers of conjugated dienes and vinyl arenes containing a catalyst prepared from a salt or chelate of nickel reduced with an aluminum compound, said method comprising the steps of (A) contacting a solution of said product in a water-immiscible solvent with 0.1–100 moles per mole of nickel of an oxidizing agent of the group consisting of oxygen, air, hydrogen peroxide, acyl peroxides, alkyl hydroperoxides and acyl hydroperoxides and an aqueous solution of citric acid, containing 0.05–50 wt. percent of the acid, said acid being present in an amount at least chemically equivalent to the nickel, then (B) separating the aqueous phase from the product, thereby removing the nickel contaminant from the product.

2. A method according to claim 1 wherein the unsaturated polymer, prior to hydrogenation, is a random copolymer of styrene and butadiene.

3. The method according to claim 1 wherein the unsaturated polymer, prior to hydrogenation, is a conjugated diene homopolymer.

4. The method according to claim 1 wherein the unsaturated polymer, prior to hydrogenation, is a block copolymer of a conjugated diene and a vinyl arene.

5. The method according to claim 4 wherein the unsaturated block copolymer, prior to hydrogenation, is polystyrene-polybutadiene-polystyrene.

6. The method according to claim 4 wherein the unsaturated block copolymer, prior to hydrogenation, is poly alpha methyl styrene-polybutadiene-poly alpha methyl styrene.

7. The method according to claim 1 wherein a nickel catalyst is used for hydrogenation.

8. A process according to claim 1 wherein the aqueous citric acid solution also contains 1–20% by weight of a water-soluble lower aliphatic monohydric alcohol.

References Cited
UNITED STATES PATENTS

| | | | |
|---|---|---|---|
| 2,893,982 | 7/1959 | Campbell | 260—94.7 A |
| 3,625,927 | 12/1971 | Yoshimoto et al. | 260—94.7 H |
| 3,513,141 | 5/1970 | Wright et al. | 260—94.7 A |

JAMES A. SEIDLECK, Primary Examiner

U.S. Cl. X.R.

260—85.1, 94.7 H, 96 HY